United States Patent
Harvey

[15] 3,703,134
[45] Nov. 21, 1972

[54] PRINT STRIPPING MECHANISM WITH SELF-ALIGNING STRIPPER FINGERS
[72] Inventor: Donald M. Harvey, Webster, N.Y.
[73] Assignee: Eastman Kodak Company, Rochester, N.Y.
[22] Filed: July 2, 1971
[21] Appl. No.: 159,324

[52] U.S. Cl. ........................................ 95/13, 95/89 R
[51] Int. Cl. .............................................. G03b 17/50
[58] Field of Search .................... 95/13, 23, 30, 89 R

[56] References Cited
UNITED STATES PATENTS
641,268   1/1900   Chase ........................... 95/30
3,424,072 1/1969   Hodgson et al. ............... 95/13

Primary Examiner—John M. Horan
Assistant Examiner—Richard L. Moses
Attorney—W. H. J. Kline et al.

[57] ABSTRACT

A processing camera for use with film units of a type including an image-recording element separably coupled to a generally rigid carrier or frame. Grooves in the frame confront the image-recording element and are adapted to receive pivotally mounted stripper fingers of the camera that separate the image-recording element from the frame as the latter is moved past the stripper fingers. The stripper fingers are provided with aligning members that engage reference surfaces on the frame to thereby establish proper alignment of the fingers relative to the frame and grooves immediately prior to entry of the fingers into the grooves.

13 Claims, 12 Drawing Figures

PATENTED NOV 21 1972 3,703,134

DONALD M. HARVEY
INVENTOR.

BY J. Adding Mathew
W. H. J. Kline
ATTORNEYS

DONALD M. HARVEY
INVENTOR.

PRINT STRIPPING MECHANISM WITH SELF-ALIGNING STRIPPER FINGERS

BACKGROUND OF THE INVENTION

The present invention relates to processing cameras for use with self-processing film units, and more specifically to means for separating an image-recording element or print from such a film unit initially comprising the element strippably coupled to a carrier.

It is well known in the photographic arts to provide film units with materials for processing the units immediately after their exposure. Generally, such film units include an image-recording portion, defined by a photosensitive element and a process sheet or second element. The photosensitive element includes a support and one or more layers of radiation-sensitive material for recording a latent image, while the process sheet is adapted to be registered with the photosensitive element for aiding in the processing of that image. A viscous processing composition is supplied to the image-recording portion at one ed and is spread toward the other end by passing the film unit between juxtaposed pressure-applying members that distribute the composition in a layer of predetermined thickness between the photosensitive element and the process sheet. The distributed composition then permeates the various layers to effect development of the latent image, as well as the construction of a visible image, usually on the process sheet. Examples of such film units in their most well known forms are disclosed in U.S. Pat. Nos. 3,080,805 and 3,511,659.

The present invention is most closely related to such film units having an image-recording portion of a "-preregistered" and "integral" type. The photosensitive element and process sheet are superposed prior to exposure, and define a composite, permanently registered structure designed to remain substantially in the same physical form after processing. The second element is transparent to permit exposure of the radiation-sensitive materials from one side of the unit, and the image or print-receiving layer is located either in the process sheet, or, preferably, in the photosensitive element, to provide an image that need not be stripped from the rest of the unit. Specific details of this latter type of film unit are disclosed, for example, in commonly assigned U.S. Pat. Application Ser. No. 027,990 entitled PHOTOGRAPHIC FILM UNIT FOR DIFFUSION TRANSFER PROCESSING, filed Apr. 13, 1970 in the name of H.E. Cole and now abandoned, and in French Pat. Nos. 2,006,255 and 2,006,256 published Dec. 26, 2969.

To facilitate their handling and manipulation, image-recording portions of the type just described can be removably attached to a substantially rigid plastic carrier or frame, that also carries a processing fluid container or pod, and an excess fluid collector or trap. The image-recording portion is releasably or strippably coupled to the frame, while the pod and trap are permanently attached thereto, in a manner permitting removal of the image-recording portion from the other elements of the film unit after the initiation of the processing. For purposes of the present disclosure, this separated image-recording portion often is referred to as a print or print unit, although a visible image may not be apparent immediately after separation.

To separate the finished print from the frame, it has been proposed previously to provide the frame with grooves or slots which extend along its lateral edges in confronting relation to the marginal surfaces of the print. The film unit is moved endwise along a predetermined path, and rigidly mounted skiving or stripper fingers in the camera enter those grooves to wedge the leading end of the print out of engagement with the frame. For purposes of the present disclosure, it will be understood that the terms "leading end" and "trailing end" refer respectively to those ends of the film unit or image-recording unit that at first and last to encounter the stripping device, regardless of the direction of movement of the film unit during the processing or print separating operations. After the fingers have entered between the print and the frame, continued movement of the film unit causes the separated end of the print to be directed through a slot or door in the camera housing. Examples of such a film unit and of the aforementioned type of stripper or skiving fingers are disclosed in commonly assigned U.S. Pat. Application Ser. No. 111,472, entitled STRIPPING MECHANISM and filed in the name of D. M. Harvey on Feb. 1, 1971.

To enable a plurality of film units to be provided in a film magazine or film pack that is as compact as possible, the film unit frames must be kept correspondingly thin. This consideration, therefore, dictates that the stripper finger grooves can be considerably wider that the tips of the fingers but must be relatively shallow; for example 0.040 inch or less in depth. Therefore, the tip of each stripper finger must be positioned accurately in predetermined initial relation to the depth of the corresponding groove to ensure that the finger will properly enter the groove. While this requirement can be accomplished with the stripper finger construction disclosed in the pending U.S. Patent Application just mentioned above, the requisite accuracy of the stripper fingers and the guide surfaces that establish the path of movement of the film unit imposes undesirable tolerance limitations on the manufacture of such cameras. Furthermore, because of such initial critical tolerances, any appreciable wear or the presence of foreign matter on the critical guide surfaces can cause malfunctioning of the stripper mechanism.

SUMMARY OF THE INVENTION

Principal objectives of the present invention are to improve the performance and reliability of a stripping device of the general type described above while at the same time reducing the cost of such a device by minimizing critical tolerance requirements.

Briefly, these and other related objectives are accomplished in accordance with a preferred embodiment of the invention by employing the stripping mechanism that includes a positioning or aligning member as well as a stripping finger. The member is adapted to engage a reference surface of the carrier or frame to properly align or position the finger relative to the carrier prior to entry of the finger between the image-recording element and the carrier. By means of this construction, the critical initial positioning of the stripper finger is established independently of the accuracy of the guide surfaces that establish the path of movement of the film unit. In accordance with one feature of the invention, the aligning member and stripper finger define a unitary structure that is especially well adapted to mass production and that eliminated corresponding tolerances previously required between various guide surfaces or the like defined by the housing or body of the similar type of camera described above.

Various means for practicing the invention and other advantages and features thereof will be apparent from the following detailed description of the preferred embodiment thereof, reference being made to the accompanying drawings in which like reference characters refer to like elements.

DESCRIPTION OF THE PREFERRED EMBODIMENT

Because processing cameras and film units are well known, the present description will be directed in particular to element forming part of or cooperating directly with the present invention. Elements not specifically shown or described here should be understood as being selectable from those known to persons skilled in the art.

Figures 1, 2:
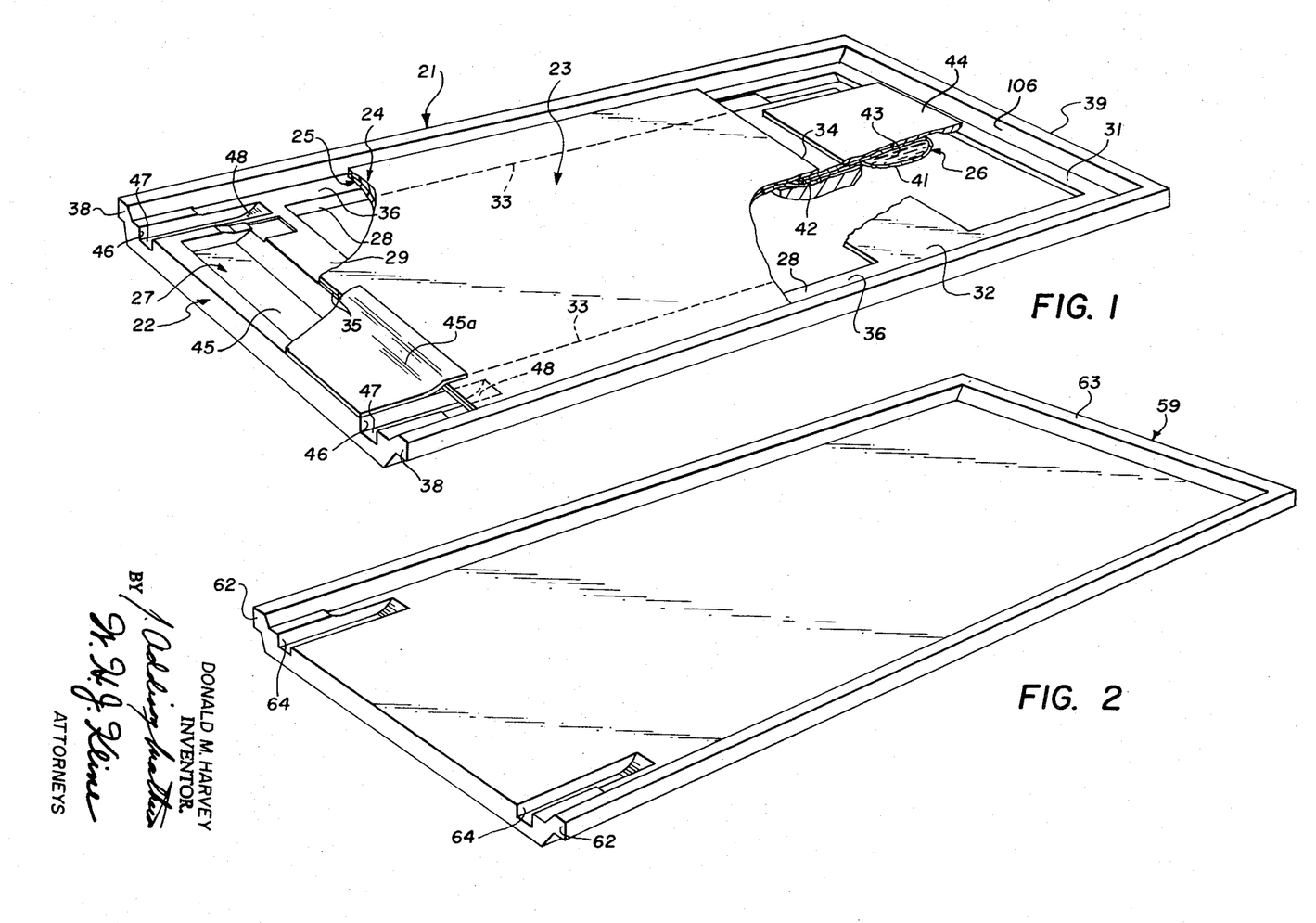
FIG. 1 is a perspective view of the reverse face of an integral preregistered film unit of the type with which the present invention is concerned.
FIG. 2 is a perspective view of the reverse face of a cover plate used in conjunction with a plurality of film units of the type shown in FIG. 1, to provide a film unit assemblage.

By reference to FIG. 1 of the drawings, a typical preregistered and integral film unit 21 of the type described above will be seen to comprise a carrier in the form of a frame 22; an image-recording portion or element or unit 23 including a rearward photosensitive sheet 24 and a forward process sheet 25; a processing fluid container or pod 26; and an excess fluid collector or trap 27. As previously mentioned, the image-recording unit is exposed from its forward side, through the transparent process sheet, but the finished print is viewed from the rearward face of the photosensitive sheet depicted in FIG. 1. The frame 22 is preferably made of an opaque generally rigid (but slightly flexible) plastic material, and includes two side rails 28 joined at one end by a trap bar 29. At the opposite end, the side rails are connected by an end or pod support bar 31 and by a cross bar 32.

As described in greater detail in the aforementioned U.S. Pat. Application Ser. No. 111,472, the two sheets 24 and 25 of the image-recording unit preferably are rectangular and coextensive with one another and can be maintained in registered or superposed facing relation by any appropriate edge seal or connection. Regardless of the particular type of edge seal or connection or its manner of application, the two sheets are secured substantially in direct contact relation to each other along their lateral marginal edges in such a manner that the central exposure areas of the sheets, depicted between broken lines 33 in FIG. 1, are retained in registered overlying relation but may be spread apart sufficiently to permit the distribution of a processing composition therebetween. Similarly the two sheets are resiliently separable from one another to permit the introduction of the processing composition between their pod ends 34 and the collection of excess processing composition from between their trap ends 35.

As shown at numeral 36, the side rails of the frame provide flat rearward facing mounting surfaces lying substantially in a single plane for supporting the marginal edges of the image-recording unit and to which such marginal edges are separably secured, preferably by a rupturable adhesive material. Beyond the lateral edges of the image-recording unit, edge ribs 38 extend rearwardly from the frame and are joined at the pod end by a similar end rib 39. As described in detail below, these ribs serve as light barriers when a plurality of film units are assembled into an assemblage and also perform guiding functions as subsequent film units are removed from and replaced into such an assemblage.

The fluid processing pod 26 may include various cooperating parts which define a suitable processing composition supplying mechanism, and preferably includes a rupturable containing part 41 comprising a rectangular piece of vapor-impervious material that is folded along one edge and sealed along its lateral sides. This discharge end 42 of the pod, sometimes referred to as a funnel, is inserted between the adjacent ends of the photosensitive and process sheets. A rupturable seal is provided along substantially the entire length of the discharge end of the pod and is adapted to release a processing fluid composition 43 from the container upon the application of hydraulic forces generated by passing the pod between a pair of juxtaposed pressure applying members, as described below. The fluid containing part of the fluid supply mechanism is permanently cemented to a cardboard shim 44 which, in turn, is permanently attached to the film unit frame.

The trap bar 29 is provided with a shallow forwardly facing trap or collector recess 45. The leading edge of the vapor-impermeable cover sheet 45a overlies the adjacent end of the image-recording unit, and the other three edges of sheet 45a are cemented or otherwise permanently attached to the frame adjacent to recess 45. Excess processing fluid extruded out of the trap end of the image-recording unit is therefore received and stored in the collector chamber or trap covered by sheet 45a.

The trap cover sheet 45a does not extend the full width of the image-recording unit but only slightly past the edges of the exposure area or separable interface between the photosensitive and process sheets, which is approximately the same width as trap recess 45. Beyond the lateral edges of the cover sheet, the frame is provided with a pair of stripper finger grooves 46 which are overlapped by the corners of the trap end of the image-recording unit releasably bonded to the frame. These grooves are open to the corresponding end of the frame and their base surfaces 47 are provided at their blind ends with curved or sloping end portions 48 behind the overlapping corners of the image-recording unit. Analogous stripper finger grooves are also provided in the film unit disclosed in the aforementioned U.S. Pat. Application Ser. No. 111,472, but it is important to note that those grooves extend the full length of the image-recording unit whereas the grooves 46 terminate a short distance beyond the the trap end of the image-recording unit. It should be understood also that the dimensions of various features of the illustrative film unit have been exaggerated in the drawings for purposes of clarity and that these grooves are relatively narrower and shallower in an actual film unit than in the illustrations.

Figure 3:
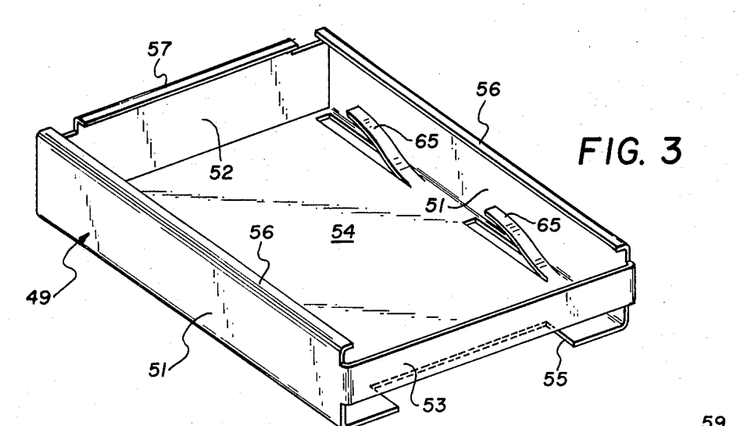
FIG. 3 is a perspective view of a film pack casing adapted to receive a film unit assemblage comprising a plurality of film units of the type shown in FIG. 1 and a cover plate of the type shown in FIG. 2.

The film units described above are preferably supplied in a film pack comprising a plurality of such units loaded into a film-pack casing 49 best shown in FIG. 3. The casing is made of plastic or sheet metal and comprises side walls 51, a full end wall 52, an opposite partial end wall 53 and a rearward wall 54 provided with a rectangular opening 55 adjacent to wall 53. Lateral retaining lips 56 project inwardly from the forward edges of the side walls and a similar end retaining lip 57 likewise projects inwardly from the forward edge of end wall 52.

Figure 4:
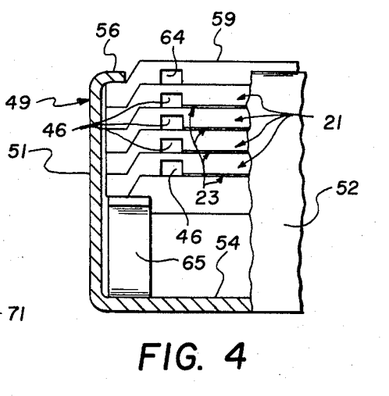
FIG. 4 is a fragmentary partially cross-sectioned end view of a fully loaded film pack comprising the components shown in FIGS. 1 through 3.

FIG. 4 illustrates a fully loaded film pack, which is depicted as comprising a film unit assemblage including a plurality of film units 21 initially protected by a cover-plate 59. The cover plate is of the same exterior dimensions as the film units and includes similar edge ribs 62 and an end rib 63, best shown in FIG. 2. As illustrated in FIG. 4, the edge and end ribs of the cover plate and film units cooperate in an overlapping or labyrinth manner to make the film unit assemblage substantially light-tight except along its trap end, which is protected from light by confronting against the inner face of casing end wall 52. For reasons explained below, the cover plate is also provided with stripper finger grooves 64 which correspond to those in the film unit frames. Four leaf springs 65 are formed integrally with the rearward wall 54 of the film pack casing and bias the film unit assemblage forwardly into contact with retaining lips 56 and 57. Because partial end wall 53 is narrower in a forward-to-rearward direction than the film pack casing, it will be seen that the forwardmost element of the film unit assemblage can be slid out of that end of the film pack casing and can be returned to the casing at the rear of the assemblage by being inserted into the casing opening between partial end wall 53 and rearward wall 54.

Figure 5:
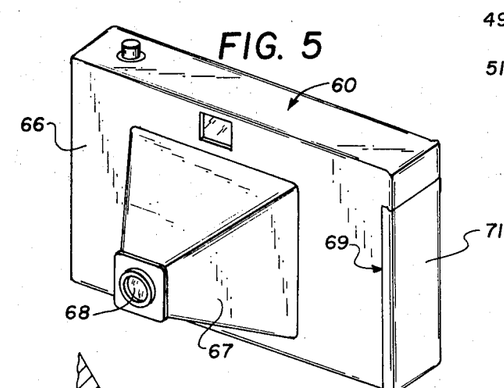
FIG. 5 is a perspective view of an illustrative camera embodying the preferred embodiment of the present invention.

By reference to FIG. 5, the illustrative camera 60 will be seen to comprise a rectangular housing 66 provide with a rigid forwardly extending enclosure 67 that supports the camera lens 68 and an appropriate shutter and diaphragm mechanism, not shown. When the film pack is loaded into the camera, it is accurately positioned within housing 66 so that the photosensitive sheet of a film unit seated against the film pack casing lips 56 and 57 is coincident with a focal plane of the camera lens. A drawer of frame transporter 69 is slidably mounted within the camera housing and can be reciprocated manually be means of its accessible end wall 71 to move it between the closed position shown in FIG. 5 and the open position shown in FIG. 6. For purposes of the present disclosure, it will suffice to understand that the drawer 69 includes a pair of opposed side bars 72 that straddle the film pack casing, one of such bars being depicted in FIG. 6. Each side bar, in turn, includes a rib 73 that lies forwardly of the corresponding film pack casing lip 56 and that carries a hook 74. When the drawer is in its fully closed position, hooks 74 are received between the corresponding ends of casing end wall lip 57 and the lateral casing lips 56 and are engageable with the adjacent end edge of the forwardmost element of the film unit assemblage. As the drawer is pulled to its open position, hooks 74 push that element out of the film pack casing and between a pair of opposed pressure rollers 75 and 76 thaT are biased toward each other by resilient spring means, not shown. When the trap end of the moving film assemblage element engaged by hooks 74 has passed beyond the pressure rollers, it is supported temporarily by the forward face 77 of stripper guide bar 78, which is mounted to the camera housing by pins 79 extending through slots 81 in the drawer side bars. The guide bar therefore maintains the trap end of the moving element in engagement with hooks 74 until just before the drawer has reached its fully open position.

A light leaf spring 82 is attached to the rearward surface of each drawer bar rib 73 and is compressed between that rib and the corresponding casing lip 56 when the drawer is closed. During the opening movement of the drawer, springs 82 engage the front margins of the moving film assemblage element and urge it rearwardly with a light resilient force. When the drawer has reached its open position, the film assemblage element is beyond supported engagement with guide bar 78, as shown in broken lines at numeral 59 in FIG. 6. Accordingly, it can then be moved rearwardly by springs 82 so that its trap end rests on rearward guide surfaces 83 of the camera housing and its pod end rests on support surface 84 of the partial rearward drawer wall 85. As shown in FIG. 7, surfaces 83 of the camera housing are located at opposite sides of a slot 86 that accommodates the partial drawer wall 85 and are straddled by converging lateral guide surfaces 87. In its rearward position just described, the film assemblage element is therefore in endwise alignment with the opening between the partial casing end wall 53 and the rearward casing wall 54. During the closing movement of the drawer, shoulder 88 of drawer wall 85 therefore pushes the film assemblage element into the rearward compartment of the film pack casing, whereupon springs 65 bias it forwardly into stacked engagement with the other elements of the film unit assemblage.

The closing of the drawer also returns hooks 74 to their initial position adjacent to the trap end of the film unit element then seated against the forward casing ribs. Accordingly, it will be apparent that repetitive opening and closing movements of the drawer will cause each element of the film unit assemblage, in turn, to be removed from its forwardmost position in the film pack and returned to the rear of the film unit assemblage.

The stripping device shown in FIGS. 6 through 12 comprises a pair of movable stripper members 89 that are attached to the camera housing by pivot pins 91 in respective openings 92 at the ends of a sloping print removal slot 93 in the rearward camera wall 94. The two stripper members are mirror-image duplicates of each other, and, as best shown in FIG. 8, each such member includes a stripper finger 95 having a pointed end or tip 96, a positioning member of arm 97 attached to the finger by a tubular connector 98, and a blocking arm 99 joined to the tubular connector. Preferably, each stripper member is made in one piece, for example, by injection molding or die casting. A relatively weak leaf spring 101 is compressed between the positioning arm 97 of each stripper member and adjacent camera wall surface 102 to resiliently bias the tip of the stripper finger forwardly to a first or extended position shown in FIGS. 6, 7 and 9, which is defined by the abutment of blocking arm 99 with surface 103 within the corresponding opening 92. When both stripper members are so extended, their respective tips are located across the movement path of the film unit and forwardly of the positions they assume upon entering the grooves in a frame being returned to the film pack.

During the initial opening and closing movements of the drawer, which remove the forward cover plate from the film pack and replace it at the back of the film unit assemblage, neither the pressure rollers nor the stripper fingers are required to perform any operative function. If the cover plate were not provided with stripper finger grooves 64, however, the square leading or trap edge of that plate would abut against the tips of the stripper fingers during the return movement of the plate, which would either block that movement or damage the fingers. By including the stripper finger grooves 64 in the cover plate, the fingers enter those grooves in the manner described below in connection with the print-stripping operation and are cammed to respective retracted positions to allow the cover plate to move past the stripping mechanism without damaging the latter. The stripper guide bar 78 maintains the returning film assemblage element in contact with the coplanar camera guide surfaces 83, and a notch 104 is provided in the guide bar as shown in FIG. 7 to accommodate shoulder 88 of the partial drawer wall.

When the opening movement of the drawer moves a film unit between the opposed rollers 75 and 76, the seal at the end of the processing fluid pod between the edges of sheets 24 and 25 is thereby ruptured and the processing fluid is extruded between those sheets. The passage of the image-recording unit between the rollers distributes the processing fluid uniformly between the photosensitive element and the process sheet to initiate development of the photographic image, and any excess processing fluid is extruded into the processing fluid trap. When the drawer is fully opened and the film unit has been moved rearwardly by springs 82, the image-recording unit or print is ready to be separated from the frame and removed from the camera.

Figure 9:
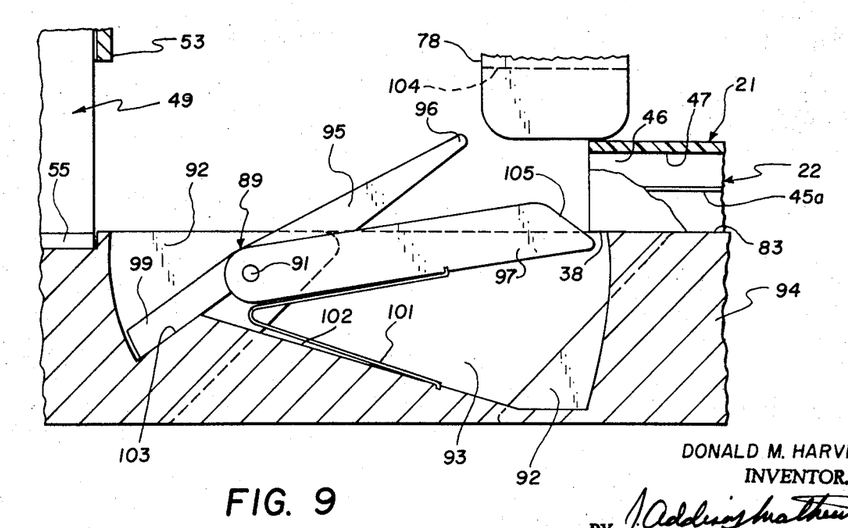
FIGS. 9 through 12 are enlarged cross-sectional views showing successive stages of operation of the film stripping device.

At the beginning of the closing movement of the drawer, the leading or trap end of the frame moves behind stripper guide bar 78 as shown in FIG. 9, thereby causing the guide bar to maintain the frame in contact with guide surfaces 83. Concurrently, the converging lateral guide surfaces 87 position the leading end of the frame laterally in alignment with the film packing casing. At the stage of operation depicted in FIG. 9, however, the tips of the stripper fingers are located forwardly beyond the corresponding grooves 46 of frame 22. As the movement of frame 22 proceeds, its leading edge encounters the sloped cam surfaces 105 of positioning arms 97 and cams those arms rearwardly in opposition to springs 101 so that the arms then ride against the rearward surfaces of the corresponding frame edge ribs 38. This movement of the stripper members aligns the tips of their respective fingers with the open ends of the grooves in the frame to ensure that the fingers enter those grooves properly. Because this critical positioning of the tips of the fingers is established by the fixed relation of the positioning arms to the tips of the corresponding fingers and by the predetermined dimensions of the film unit frame, it should be apparent that inaccuracies in the relative locations of the various camera guide surfaces have little or no influence on the performance of the stripping device.

Figure 11:
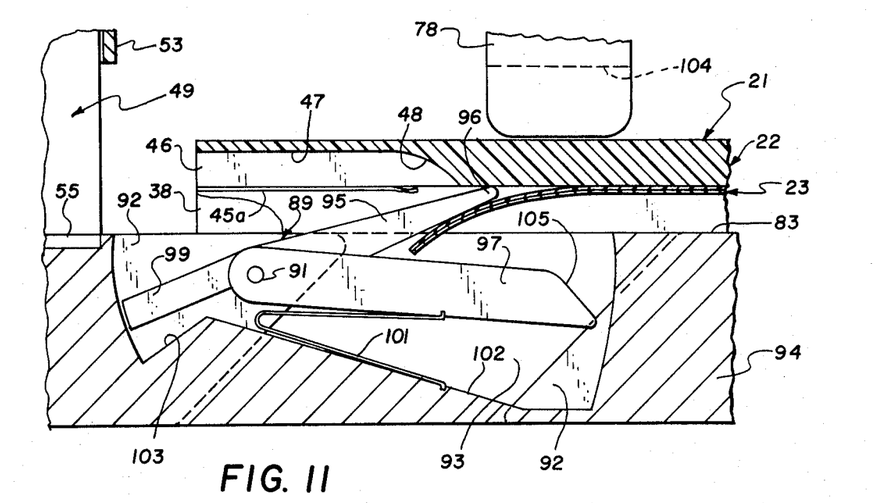

Upon further movement of the film unit, the tips of the stripper fingers enter the blind ends of the stripper finger grooves overlapped by the corresponding leading corners of the print and encounter the sloped portions 48 of groove surfaces 47. Because the frame is prevented from moving forwardly by guide bar 78, its continued endwise movement causes the sloped end portions of the grooves to cam the tips of the stripper fingers rearwardly, thereby moving the fingers out of the grooves as shown in FIG. 11. This positive rearward movement of the tips of the stripper fingers causes them to separate the leading corners of the print from the frame and to direct the freed leading end of the print into print removal slot 93. Thereafter, the tips of the stripper fingers remain between the margins of the print and the confronting frame surfaces and wedge the print free of the frame as the movement of the latter continues.

Figure 12:
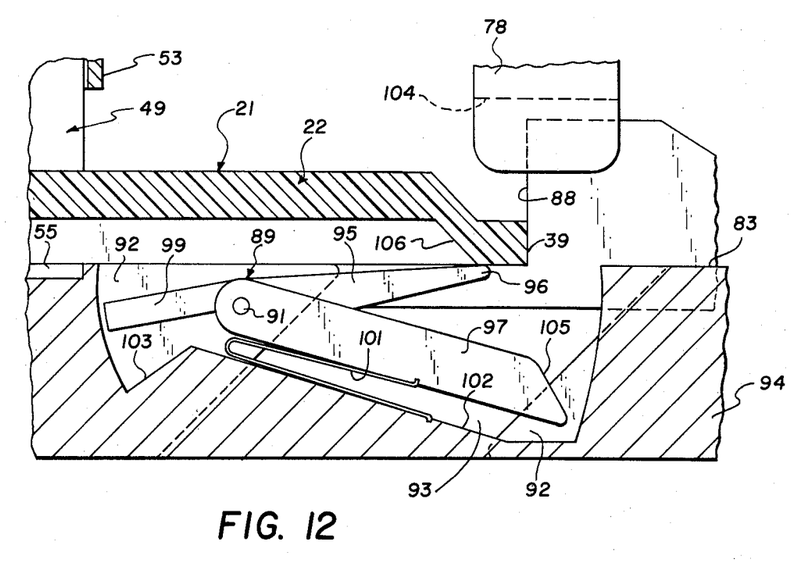

After the movement of the film unit has caused the print to be completely separated from the frame, the tips of fingers 95 encounter end rib 39 of the frame. As shown in FIGS. 1 and 12, the inner face 106 of this end rib is sloped so that it cams the stripper members of their extreme rearward positions in opposition to springs 101, thereby allowing the end rib of the frame to pass the stripping mechanism; whereupon springs 101 return the stripper members to their respective initial extended positions shown in FIGS. 6, 7 and 9.

It will thus be seen that, in accordance with the preferred embodiment of the present invention as illustrated in the accompanying drawings, an improved photographic apparatus such as the camera 60 is provided for use with a film unit such as film unit 21, the film unit including an image-recording element such as element 23 strippably coupled to a carrier such as frame 22.

Figure 6:
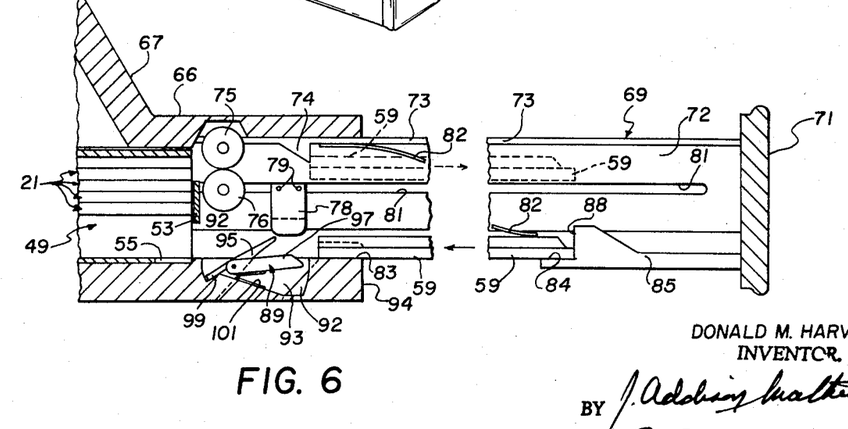
FIG. 6 is a somewhat schematic cross-sectional view of the camera of FIG. 5 with certain components thereof shown in a moved position.
Figures 7, 8:
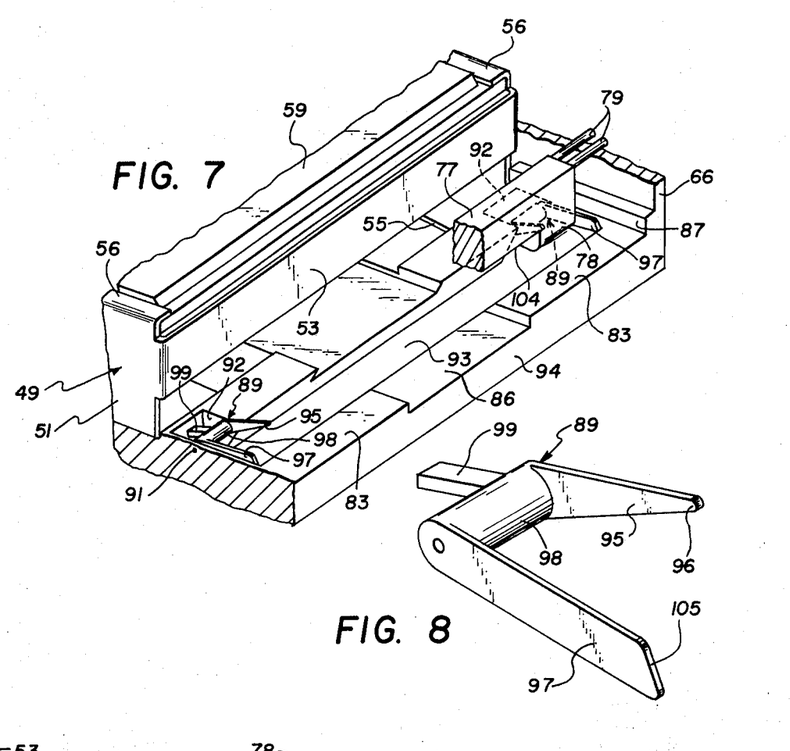
FIG. 7 is a fragmentary perspective view of the camera of FIG. 5 illustrating the preferred embodiment of the film stripping device to which the present invention is specifically directed.
FIG. 8 is a perspective view of one of the two stripper members employed in the camera of FIG. 5.
Figure 10:
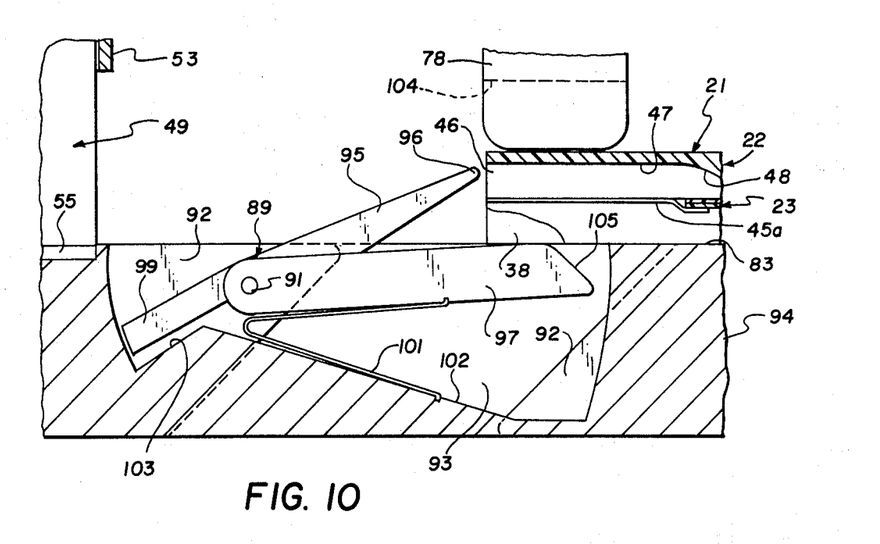

The apparatus may be described as comprising a tripper finger, such as finger 95, for engaging the image-recording element and the carrier to separate the element from the carrier; first means, such as the drawer or frame transporter 69 which is slidably mounted within camera housing 66 for reciprocation between its open position shown in FIG. 6 and its closed position shown in FIG. 5, for effecting movement of the carrier relative to the finger and for defining a movement path for the carrier extending from a first position on one side of the finger, such as the position of frame 22 shown in FIG. 9, to a second position on the opposite side of the finger, such as the position occupied by frame 22 when returned to film pack casing 49; and second means, such as positioning arm 97, fixedly coupled to the finger, as by connector 98, and disposed in the movement path between the finger and the first position, such as shown generally in FIG. 9, for establishing a position of engagement of the finger with the carrier, such as that shown generally in FIG. 10, in response to movement of the carrier from the first position into engagement with the second means, such as the movement of frame 22 from its position shown in FIG. 9 to its position shown in FIG. 10.

Or, the apparatus may be described in different terms as comprising a stripping mechanism including means, such as the pair of movable stripper members 89, defining first and second spaced engagement portions, such as stripper finger 95 and positioning arm 97, respectively, for stripping the element from the carrier, such as shown in FIG. 11, and for positioning the first engagement portion relative to the carrier, such as shown in FIGS. 9 and 10, the first and second engagement portions having fixed relative positions, such as by attachment through connector 98; first means, such as guide surfaces 83, for establishing a movement path between the stripping mechanism and the carrier to direct the carrier into engagement with the second engagement portion, such as shown in FIGS. 6, 9, and 10; and means mounting the stripping mechanism and the first means, such as pins 91 in openings 92 and wall 94, respectively, for permitting relative movement between the first engagement portion and the first means in directions substantially perpendicular to the movement path to establish relative positions of the first engagement portion and the carrier in said directions in response to movement of the carrier into engagement with the second engagement portion, such as shown in FIGS. 9 and 10.

It should now be apparent that an improved stripping mechanism has been provided for separating an image-recording element from a carrier to which the element is strippably coupled. The mechanism is self-aligning, in the sense that the relative positions of engagement between the stripping member and the carrier are established directly from the carrier rather than through other camera parts. The many advantages and improvements inherent in such a mechanism have been set forth or will be apparent from the above description.

The invention has been described in detail with particular reference to the preferred embodiment thereof, but it will be understood that variations and modifications can be effected within the spirit and scope of the invention.

I claim:

1. Photographic apparatus for use with a film unit including an image-recording element strippably coupled to a carrier, said apparatus comprising:
   a stripper finger for engaging the image-recording element and the carrier to separate the element from the carrier;
   first means for effecting movement of the carrier relative to said finger and for defining a movement path extending from a first position on one side of said finger to a second position on the opposite side of said finger; and
   second means fixedly coupled to said finger and disposed in said movement path between said finger and said first position for establishing a position of engagement of said finger with the carrier in response to movement of the carrier from said first position into engagement with said second means.

2. Photographic apparatus as claimed in claim 1 wherein said movement path between said first and second positions defines a substantially straight line; and wherein said stripper finger includes an end portion for entering between the carrier and the image-recording element, said end portion being movable by said second means in directions substantially perpendicular to said movement path to establish said position of engagement of said finger with the carrier.

3. Photographic apparatus as claimed in claim 1 wherein said stripper finger and said second means are mounted for joint pivotal movement of said apparatus.

4. Photographic apparatus for use with a film unit including an image-recording element strippably coupled to a carrier, said apparatus comprising:
   a stripper finger for engaging the image-recording element and the carrier to separate the element from the carrier;
   means for effecting movement of the carrier relative to said finger and for defining a movement path extending from a first position on one side of said finger to a second position on the opposite side of said finger;
   means for movably mounting said finger on said apparatus and for resiliently maintaining said finger in a first orientation extending across said movement path; and
   means fixedly coupled to said finger and disposed in said movement path between said finger and said first position for moving said finger to a second orientation, aligned for engagement with the element and the carrier, in response to movement of the carrier from said first position into engagement with said moving means.

5. Photographic apparatus for use with a film unit having an image-recording element strippably coupled to a carrier, said apparatus comprising:
   a stripping mechanism including a stripper finger for engaging the image-recording element and the carrier to strip the element from the carrier and a positioning member for establishing a position of said finger for engaging the carrier, said member being fixedly coupled to said finger and mounted for movement therewith on said apparatus; and
   means for effecting movement of the carrier first into engagement with said member and then into engagement with said finger.

6. Photographic apparatus for use with a film unit, the film unit having an image-recording element strippably coupled to a carrier, said apparatus comprising:
  a stripping mechanism including means defining first and second spaced engagement portions for stripping the element from the carrier and for positioning said first engagement portion relative to the carrier, respectively, said first and second engagement portions having fixed relative positions;
  first means for establishing a movement path between said stripping mechanism and the carrier to direct the carrier into engagement with said second engagement portion; and
  means mounting said stripping mechanism and said first means for relative movement between said first engagement portion and said first means in directions substantially perpendicular to said movement path to establish relative positions of said first engagement portion and the carrier in said directions in response to movement of the carrier into engagement with said second engagement portion.

7. A stripping mechanism for use with a film unit, the film unit having an image-recording element strippably coupled to a carrier, said mechanism comprising:
  a stripper member for engaging the image-recording element and the carrier to strip the element from the carrier;
  means for effecting relative movement between said stripper member and the carrier both in a first direction for establishing an initial movement path and in a second direction substantially perpendicular to said first direction for establishing an orientation of said member relative to said initial movement path; and
  means fixed relative to said stripper member and extending into said initial movement path for engaging the carrier before said member engages the carrier and for establishing an orientation of said member relative to the carrier prior to engagement between said member and the carrier.

8. In a camera adapted to expose and initiate processing of a film unit, the film unit including a substantially rectangular image-recording unit separably coupled to a generally rigid frame, the frame defining lateral edges and a leading end and having a pair of grooves extending parallel to the lateral edges, the grooves being open to the leading end and overlapped by the image-recording unit, an improvement in means for initiating separation of the image-recording unit from the frame comprising in combination:
  guide means for establishing a movement path along which the frame is adapted for endwise movement, leading end first;
  a pair of stripper members, each including a stripper finger having a pointed tip and a positioning member located in fixed relation to said pointed tip;
  means supporting each of said stripper members for movement between a first position wherein said pointed tip lies across said movement path and a second position wherein said pointed tip lies in said movement path;
  resilient means biasing each of said stripper members toward said first position; and
  cam means on said positioning member and extending into said movement path when each of said stripper members is in said first position for engaging the leading end during the endwise movement and for camming each of said stripper members to said second position so that said pointed tip can enter one of the grooves at the leading end.

9. The improvement claimed in claim 8 wherein each of said stripper members is a unitary one-piece element.

10. The improvement claimed in claim 8 wherein each of said stripper members is pivotally supported in said camera by said supporting means.

11. The improvement claimed in claim 10 wherein said positioning member comprises an arm rigidly attached to said stripper finger.

12. The improvement claimed in claim 10 wherein each of said stripper members includes a connector member rigidly connecting said stripper finger and said positioning member in laterally spaced relation to each other.

13. The improvement claimed in claim 8 wherein each of said stripper members is movable in opposition to said resilient means from said first position past said second position to a third position wherein said pointed tip can withdraw from said one of the grooves as the grooves move past said stripper members during the endwise movement.

* * * * *